(12) United States Patent
Morrow et al.

(10) Patent No.: US 9,810,040 B2
(45) Date of Patent: Nov. 7, 2017

(54) METHODS FOR INHIBITING SCALE FORMATION IN A HYDROCARBON WELL

(71) Applicants: Timothy I. Morrow, Humble, TX (US); Geetha Mahadevan, The Woodlands, TX (US)

(72) Inventors: Timothy I. Morrow, Humble, TX (US); Geetha Mahadevan, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 27 days.

(21) Appl. No.: 14/865,042

(22) Filed: Sep. 25, 2015

(65) Prior Publication Data

US 2016/0177672 A1    Jun. 23, 2016

Related U.S. Application Data

(60) Provisional application No. 62/180,833, filed on Jun. 17, 2015, provisional application No. 62/096,252, filed on Dec. 23, 2014.

(51) Int. Cl.
*E21B 37/06* (2006.01)
*C09K 8/528* (2006.01)

(52) U.S. Cl.
CPC .............. *E21B 37/06* (2013.01); *C09K 8/528* (2013.01); *C09K 2208/32* (2013.01)

(58) Field of Classification Search
CPC ...... E21B 37/06; C09K 8/528; C09K 2208/32

USPC ......................................................... 166/300
See application file for complete search history.

(56) References Cited

U.S. PATENT DOCUMENTS

| 4,485,874 | A | * | 12/1984 | Meyers | ................. | C09K 8/528 166/279 |
| 5,141,655 | A | * | 8/1992 | Hen | ....................... | C09K 8/528 166/279 |
| 2006/0162928 | A1 | * | 7/2006 | Collins | ................. | C09K 8/512 166/279 |
| 2011/0105368 | A1 | * | 5/2011 | Welton | .................... | C04B 18/02 507/237 |
| 2012/0325471 | A1 | * | 12/2012 | Mukhopadhyay | ..... | C09K 8/706 166/279 |

* cited by examiner

*Primary Examiner* — Silvana Runyan
(74) *Attorney, Agent, or Firm* — ExxonMobil Upstream Research Company—Law Department

(57) ABSTRACT

Methods for inhibiting scale formation in a hydrocarbon well that includes a wellbore that extends within a subterranean formation and a selective-release scale inhibitor located within a portion of the subterranean formation. The methods include locating a selective-release scale inhibitor within a portion of the subterranean formation and producing a reservoir fluid from the subterranean formation via the hydrocarbon well, including facilitating a change in environmental conditions present within the portion of the subterranean formation from initial environmental conditions to subsequent environmental conditions. Under the initial environmental conditions, the selective-release scale inhibitor is insoluble both in hydrocarbons and in water. Under the subsequent environmental conditions, the selective-release scale inhibitor is soluble in water.

20 Claims, 2 Drawing Sheets

METHODS FOR INHIBITING SCALE FORMATION IN A HYDROCARBON WELL

CROSS-REFERENCE TO RELATED APPLICATION

This application claims the benefit of both U.S. Provisional Patent Application No. 62/180,833 filed Jun. 17, 2015 entitled SYSTEMS AND METHODS FOR INHIBITING SCALE FORMATION IN A HYDROCARBON WELL, and U.S. Provisional Patent Application 62/096,252 filed Dec. 23, 2014 entitled DELAYED ACTIVATION SCALE INHIBITOR AND PROCESS AND SYSTEMS, the entireties of both of which are incorporated by reference herein.

FIELD OF THE DISCLOSURE

The present disclosure is directed generally to systems and methods for inhibiting scale formation in a hydrocarbon well, and more particularly to systems and methods that utilize a selective-release scale inhibitor to inhibit scale formation within the hydrocarbon well.

BACKGROUND OF THE DISCLOSURE

Hydrocarbon wells may be susceptible to scale formation, or build-up. Such scale may be deposited from reservoir fluids, such as water, that may be present within a subterranean formation and may restrict fluid flow within the hydrocarbon well. As examples, the scale may build up within a pore structure of the subterranean formation, within fractures that extend within the subterranean formation, and/or within one or more fluid conduits that may form a portion of and/or be associated with the hydrocarbon well. Regardless of the exact location and/or mechanism, deposition of scale within the subterranean formation and/or within the hydrocarbon well may restrict, or even block, production from the subterranean formation via the hydrocarbon well.

Historically, scale inhibitors have been deployed downhole to prevent scale formation. While such scale inhibitors may be effective, they have a limited useful lifetime and typically are depleted quickly from the subterranean formation. In addition, and while it may be cost-effective to deploy the scale inhibitors during formation and/or completion of the hydrocarbon well, deploying the scale inhibitors subsequent to initiating production from the hydrocarbon well may be disruptive and/or costly. Thus, there exists a need for improved systems and methods for inhibiting scale formation in a hydrocarbon well.

SUMMARY OF THE DISCLOSURE

Systems and methods for inhibiting scale formation in a hydrocarbon well are disclosed herein. The systems include a hydrocarbon well that includes a wellbore that extends within a subterranean formation and a selective-release scale inhibitor that is located within a portion of the subterranean formation. The selective-release scale inhibitor is configured to be at least substantially insoluble in hydrocarbons. The selective-release scale inhibitor also is configured to be at least substantially insoluble in water at initial environmental conditions that are present within the portion of the subterranean formation when the selective-release scale inhibitor initially is located within the portion of the subterranean formation. However, the selective-release scale inhibitor is configured to be soluble in water at subsequent environmental conditions that are present within the portion of the subterranean formation subsequent to the selective-release scale inhibitor being located within the portion of the subterranean formation.

The methods include locating a selective-release scale inhibitor within a portion of the subterranean formation and producing a reservoir fluid from the subterranean formation via the hydrocarbon well. The methods further include facilitating a change in environmental conditions present within the portion of the subterranean formation from initial environmental conditions to subsequent environmental conditions. Under the initial environmental conditions, the selective-release scale inhibitor is insoluble both in hydrocarbons and in water. Under the subsequent environmental conditions, the selective-release scale inhibitor is soluble in water.

DETAILED DESCRIPTION AND BEST MODE OF THE DISCLOSURE

Figure 1:
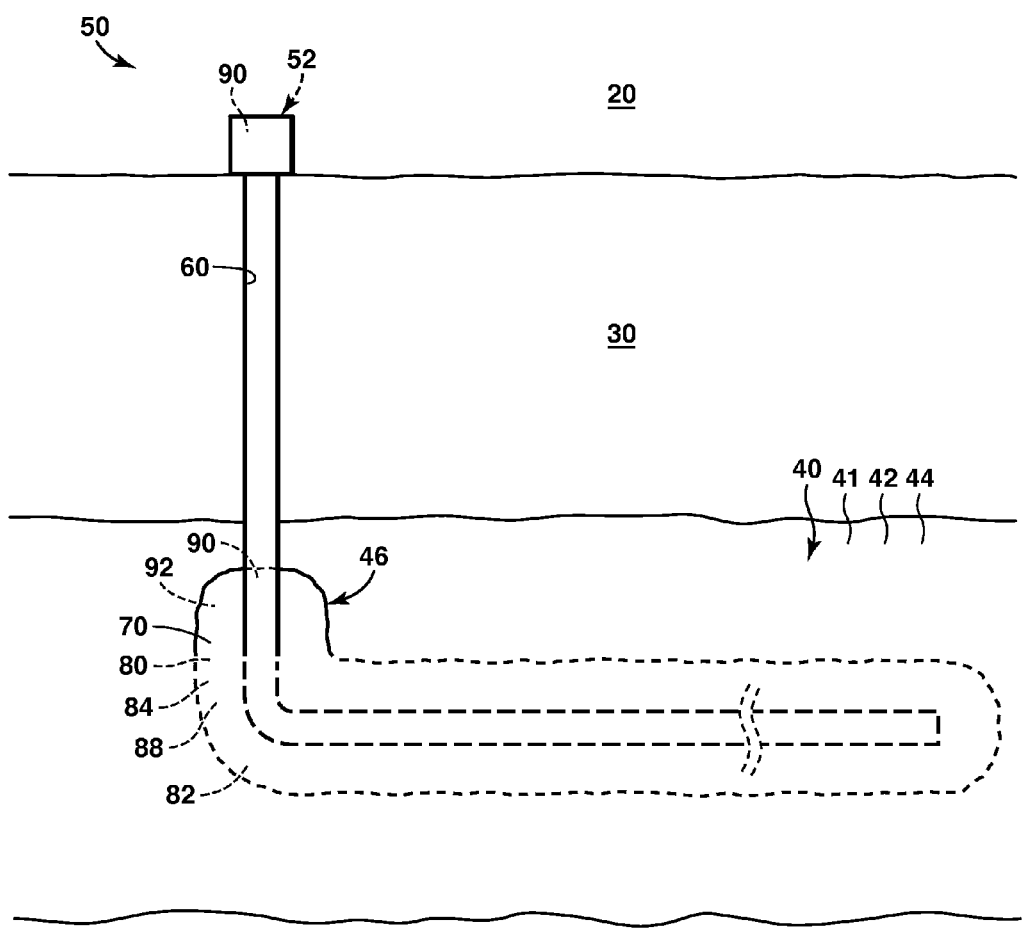
FIG. 1 is a schematic representation of examples of a hydrocarbon well according to the present disclosure.
Figure 2:
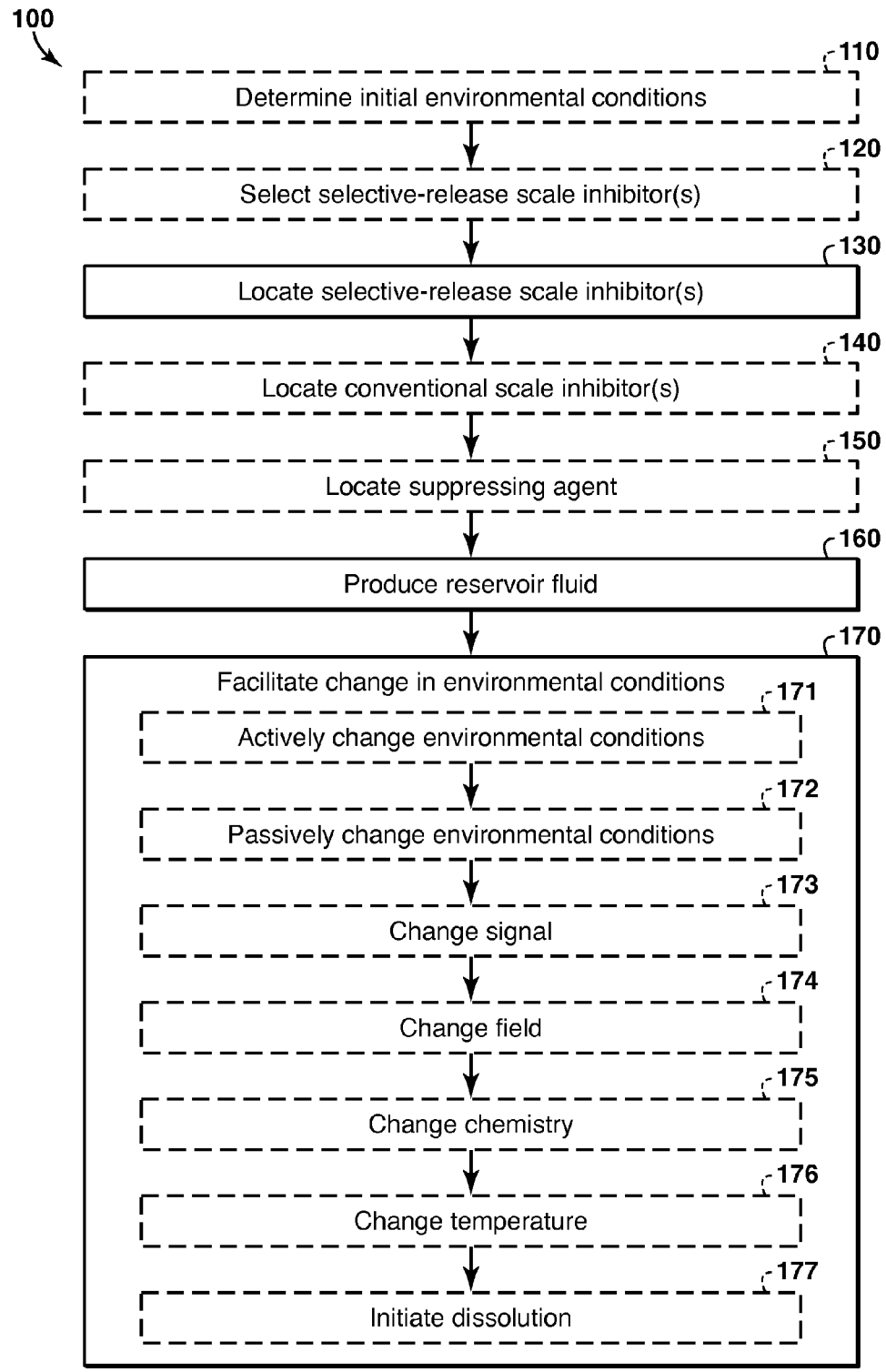
FIG. 2 is a flowchart depicting methods, according to the present disclosure, of inhibiting scale formation in a hydrocarbon well that extends within a subterranean formation.

FIGS. 1-2 provide examples of hydrocarbon wells 50 and/or of methods 100, according to the present disclosure. Elements, components, and/or features that are discussed herein with reference to one or more of FIGS. 1-2 may be included in and/or utilized with either of FIGS. 1-2 without departing from the scope of the present disclosure.

In general, elements that are likely to be included are illustrated in solid lines, while elements that are optional are illustrated in dashed lines. However, elements that are shown in solid lines may not be essential. Thus, an element shown in solid lines may be omitted without departing from the scope of the present disclosure.

FIG. 1 is a schematic representation of examples of a hydrocarbon well 50 according to the present disclosure. Hydrocarbon well 50 includes a wellbore 60 that extends within a subterranean formation 40, which is present within a subsurface region 30, and/or that extends between a surface region 20 and the subterranean formation. Subterranean formation 40 may include a reservoir fluid 41 in the form of one or more hydrocarbons 42 and/or water 44.

Hydrocarbon well 50 also includes a selective-release scale inhibitor 70. Selective-release scale inhibitor 70 is located within a portion 46 of subterranean formation 40, which may be near, proximal to, and/or in fluid communication with wellbore 60. In addition, selective-release scale inhibitor 70 is adapted, configured, designed, selected, formulated, and/or synthesized to be at least substantially insoluble in hydrocarbons 42. Furthermore, selective-release scale inhibitor 70 also is adapted, configured, designed, selected, formulated, and/or synthesized to be selectively soluble in water 44.

As an example, selective-release scale inhibitor 70 may be insoluble in water at initial environmental conditions that may be present within portion 46 of subterranean formation 40 when the selective-release scale inhibitor initially is located within the portion of the subterranean formation. As another example, selective-release scale inhibitor 70 may be soluble in water at subsequent environmental conditions that may be present within portion 46 of subterranean formation 40 subsequent to the selective-release scale inhibitor being located within the portion of the subterranean formation.

The presence of such a selective-release scale inhibitor within subterranean formation 40 and/or within hydrocarbon well 50 may permit and/or facilitate selective inhibition of scale formation and/or inhibition of scale formation over a significantly longer timeframe than may be realized utilizing traditional and/or conventional scale inhibitors that are not selective-release in nature or that are not a selective-release scale inhibitor 70. As an example, and as discussed in more detail herein, selective-release scale inhibitor 70 may remain within subterranean formation 40 and/or within hydrocarbon well 50, may remain dormant within subterranean 40 and/or within hydrocarbon well 50, may remain at least substantially insoluble in water, may remain completely insoluble in water, and/or may not suppress scale formation while the initial environmental conditions are present within the portion of the subterranean formation. However, responsive to the subsequent environmental conditions being present within the portion of the subterranean formation, the selective-release scale inhibitor becomes active, initiates dissolution in water, and/or initiates suppression of scale formation.

Thus, by controlling, regulating, and/or changing environmental conditions within the portion of the subterranean formation, an operator of hydrocarbon well 50 may selectively initiate use and/or depletion of selective-release scale inhibitor 70 thereby selectively initiating suppression of scale formation via the selective-release scale inhibitor. This may include facilitating any suitable active and/or passive change in the environmental conditions, as discussed in more detail herein.

As discussed, traditional and/or conventional scale inhibitors may not provide selective scale inhibition, may not be configured for selective dissolution within water, and/or may be depleted relatively quickly from the subterranean formation when compared to selective-release scale inhibitors 70 according to the present disclosure. That said, such traditional and/or conventional scale inhibitors may be included in subterranean formation 40, may be included within hydrocarbon well 50, and/or may be utilized in combination with selective-release scale inhibitors 70 without departing from the scope of the present disclosure.

As an example, subterranean formation 40 and/or hydrocarbon well 50 may include and/or contain both a conventional scale inhibitor 82 and selective-release scale inhibitor 70. Under these conditions, the conventional scale inhibitor generally will initiate dissolution within water and/or inhibition of scale formation immediately upon contact with water, such as at the initial environmental conditions. Thus, the conventional scale inhibitor may be utilized to initially inhibit scale formation. However, and subsequent to at least partial, or even complete, depletion of the conventional scale inhibitor, selective-release scale inhibitor 70 may, or may be utilized to, provide additional, longer-acting, and/or selective scale inhibition.

As used herein, the phrase "environmental conditions" may include and/or be any suitable intensive and/or extensive property, parameter, value, and/or condition of the portion of the subterranean formation that may be changed with time and that may, or may be utilized to, cause selective-release scale inhibitor 70 to transition from being at least substantially insoluble in water (as under the initial environmental conditions) to being at least substantially soluble in water (as under the subsequent environmental conditions). Examples of environmental conditions that may be changed to transition the portion of the subterranean formation from the initial environmental conditions to the subsequent environmental conditions include a temperature of the portion of the subterranean formation, a pressure within the portion of the subterranean formation, a pH of the portion of the subterranean formation, a salinity of the portion of the subterranean formation, a solute concentration within the portion of the subterranean formation, a light intensity within the portion of the subterranean formation, an electromagnetic field strength within the portion of the subterranean formation, a magnetic field strength within the portion of the subterranean formation, an electric field strength within the portion of the subterranean formation, an ultrasonic signal intensity within the portion of the subterranean formation, and/or a radio frequency signal strength within the portion of the subterranean formation.

As used herein, the term substantially is utilized to indicate that a given property is generally present, is effectively present, is essentially present, is present to a significant extent, and/or is present in important, or significant, aspects thereof. However, the term substantially should not necessarily be construed to require that the given property necessarily, or absolutely, is present. As an example, the phrases "substantially insoluble" and/or "at least substantially insoluble" are intended to indicate that a given material is generally insoluble, effectively insoluble, and/or essentially insoluble. However, such an interpretation does not preclude a small amount of solubility. As examples, a material may be referred to herein as being at least substantially insoluble in a liquid if the material has a maximum solubility, or solubility limit, of less than 0.001 parts per million (ppm), less than 0.01 ppm, less than 0.1 ppm, less than 0.5 ppm, less than 1 ppm, less than 2 ppm, less than 3 ppm, less than 4 ppm, less than 5 ppm, less than 7.5 ppm, and/or less than 10 ppm in the liquid.

Similarly, the phrases "substantially soluble" and/or "at least substantially soluble" are intended to indicate that a given material is generally soluble, is effectively soluble, and/or is essentially soluble. However, such an interpretation should not be interpreted to require completely solubility in any fraction, or proportion, and/or to any concentration. As examples, a material may be referred to herein as being at least substantially soluble in a liquid if the material has a maximum solubility, or solubility limit, of at least 1 ppm, at least 2 ppm, at least 3 ppm, at least 4 ppm, at least 5 ppm, at least 7.5 ppm, at least 10 ppm, at least 15 ppm, at least 20 ppm, at least 30 ppm, at least 40 ppm, at least 50 ppm, at least 75 ppm, or at least 100 ppm in the liquid.

As illustrated in dashed lines in FIG. 1, hydrocarbon well 50 further may include, be associated with, and/or utilize an environmental condition control assembly 90; however, this is not required in all embodiments. Environmental condition control assembly 90 may be configured to selectively change conditions within portion 46 of subterranean formation 40. This may include selectively changing the conditions from the initial environmental conditions to the subsequent environmental conditions, thereby selectively initiating suppression of scale formation by selective-release scale inhibitor 70.

As illustrated in FIG. 1, environmental condition control assembly 90 may be located in and/or associated with any suitable portion of hydrocarbon well 50 and/or of subterranean formation 40. As examples, environmental condition control assembly 90 may be associated with a wellhead 52 of hydrocarbon well 50, may be located within wellbore 60, and/or may be located within portion 46 of subterranean formation 40.

Environmental condition control assembly 90 may include and/or be any suitable structure, and a structure of the environmental condition control assembly may be based upon and/or may dictate a composition of selective-release scale inhibitor 70. As an example, environmental condition control assembly 90 may include and/or be an active environmental condition control assembly that is configured to directly, actively, and/or purposefully change the environmental conditions within the subterranean formation. Additionally or alternatively, environmental condition control assembly 90 also may include and/or be a passive environmental condition control assembly that is configured to indirectly, passively, and/or incidentally change the environmental conditions within the subterranean formation.

As an example, environmental condition control assembly 90 may include and/or be a heating assembly that is configured to heat the portion of the subterranean formation. As another example, environmental condition control assembly 90 may include and/or be a signal generation assembly that is configured to distribute a signal within the portion of the subterranean formation. As another example, environmental condition control assembly 90 may include and/or be a transmitter that is configured to transmit a signal and/or to generate a field within the portion of the subterranean formation.

As yet another example, environmental condition control assembly 90 may include and/or be an electric field generation assembly that is configured to distribute an electric field within the portion of the subterranean formation.

As another example, environmental condition control assembly 90 may include and/or be a magnetic field generation assembly that is configured to distribute a magnetic field within the portion of the subterranean formation. As yet another example, environmental condition control assembly 90 may include and/or be an electromagnetic radiation generation assembly that is configured to distribute an electromagnetic field within the portion of the subterranean formation. As another example, environmental condition control assembly 90 may include and/or be a visible light generation assembly that is configured to distribute visible light within the portion of the subterranean formation. As yet another example, environmental condition control assembly 90 may include and/or be a radio frequency generation assembly that is configured to distribute a radio frequency signal within the portion of the subterranean formation. As another example, environmental condition control assembly 90 may include and/or be an ultrasonic signal generation assembly that is configured to distribute an ultrasonic signal within the portion of the subterranean formation.

As yet another example, environmental condition control assembly 90 may include and/or be a pumping assembly that is configured to provide an aqueous fluid to the portion of the subterranean formation and/or to remove the aqueous fluid from the subterranean formation. Examples of the aqueous fluid include an acidic solution, a basic solution, a salt water solution, and/or fresh water. Under these conditions, supply of the aqueous fluid to the subterranean formation and/or removal of the aqueous fluid from the subterranean formation may change a pH and/or a salinity of water that is present within the subterranean formation.

As another example, the pumping assembly may be configured to remove reservoir fluids, including hydrocarbons 42 and/or water 44, from the subterranean formation. Under these conditions, the pumping assembly may change a relative ratio of hydrocarbons to water within the subterranean formation and/or may cause another fluid, which may naturally be present within the subterranean formation but not within portion 46 of the subterranean formation, to enter portion 46 of the subterranean formation, thereby changing the conditions within portion 46.

Selective-release scale inhibitor 70 may include and/or be any suitable material that may be adapted, configured, designed, selected, formulated, and/or synthesized to be at least substantially insoluble in water at the initial environmental conditions (thereby being inactive and/or not inhibiting scale formation) and soluble in water at the subsequent environmental conditions (thereby being active and/or inhibiting scale formation). In addition, at least one characteristic of the selective-release scale inhibitor may be based upon the specific difference, or differences, between the initial environmental conditions and the subsequent environmental conditions and/or on the nature of environmental condition control assembly 90, when present. Examples of the selective-release scale inhibitor, of materials that may be included in the selective-release scale-inhibitor, and/or of materials that may inhibit scale formation include phosphonate-based scale inhibitors, carboxylic acid-based scale inhibitors, sulfonate-based scale inhibitors, and/or polymer-based scale inhibitors.

Additional examples of selective-release scale inhibitor 70 include a polymer-encapsulated scale inhibitor, which includes a scale inhibitor encapsulated in a polymer, and/or a polymer matrix-suspended scale inhibitor, which includes the scale inhibitor suspended within a matrix of the polymer. Under these conditions, the polymer may be configured to selectively release the scale inhibitor responsive to the change from the initial environmental conditions to the subsequent environmental conditions.

The polymer may include any suitable polymer. As an example, the polymer may include and/or be a thermo-responsive polymer. Under these conditions, the change in environmental conditions may include a temperature change within the portion of the subterranean formation.

As another example, the polymer may include and/or be a swellable polymer that swells (i.e., expands in size) at high pH or a swellable polymer that swells at low pH. Under these conditions, the change in the environmental conditions may include a change in pH within the portion of the subterranean formation.

As further example, the polymer may include and/or be a shrinkable polymer that shrinks (i.e., reduces in size) at high pH or a shrinkable polymer that shrinks at low pH. Under these conditions, the change in the environmental conditions may include a change in pH within the portion of the subterranean formation.

As yet another example, the polymer may include and/or be a selectively soluble polymer. Under these conditions, the polymer may be at least substantially, or even completely, insoluble in water at the initial environmental conditions and soluble in water at the subsequent environmental conditions.

As another example, the polymer may include and/or be a magnetoresponsive polymer. Under these conditions, the change in the environmental conditions may include a change in a magnetic field, or magnetic field strength, which is present within the portion of the subterranean formation. Examples of magnetoresponsive polymers include an acetate copolymer with magnetic microparticles and ethylene-vinyl acetate.

As yet another example, the polymer may include and/or be a redox polymer. Under these conditions, the change in environmental conditions may include a change in an electric field and/or in an electric potential that is present within the portion of the subterranean formation.

Another example of selective-release scale inhibitor 70 includes a material that is configured to precipitate from aqueous solution, or from water, at the initial environmental conditions and to be at least partially, or even completely, soluble in aqueous solution, or in water, at the subsequent environmental conditions. Another example of selective-release scale inhibitor 70 includes a material that is configured to be strongly sorbed to a substrate at the initial environmental conditions and to desorb from the substrate at the subsequent environmental conditions.

The substrate may include any suitable structure and/or material that may be present, either naturally or artificially, within the subterranean formation. As examples, the substrate may include and/or be a rock that is native to the subterranean formation, a rock matrix that is native to the subterranean formation, sand that is native to the subterranean formation, clay that is native to the subterranean formation, and/or a proppant that is introduced into the subterranean formation during formation and/or completion of the hydrocarbon well.

Selective-release scale inhibitor 70 may be configured to be at least substantially, or even completely, insoluble in hydrocarbons and to be at least substantially, or even completely, insoluble in water when greater than a threshold concentration of a suppressing agent 80 is present within water 44 that is present within subterranean formation 40.

Examples of the threshold concentration include threshold concentrations of 0.5 parts per million (ppm), 1 ppm, 2 ppm, 4 ppm, 6 ppm, 8 ppm, 10 ppm, 15 ppm, 20 ppm, 30 ppm, 40 ppm, 50 ppm, 75 ppm, or 100 ppm.

Under these conditions, the initial environmental conditions may include greater than the threshold concentration of the suppressing agent within the portion of the subterranean formation. Conversely, the subsequent environmental conditions may include less than the threshold concentration of the suppressing agent within the portion of the subterranean formation.

Suppressing agent 80 may include any suitable material that is configured to suppress dissolution of selective-release scale inhibitor 70 within water. As examples, suppressing agent 80 may include and/or be a multivalent ion, a metal ion, a multivalent metal ion, a calcium ion, an iron ion, a zinc ion, a lead ion, a mercury ion, a chromium ion, a magnesium ion, and/or a silver ion.

As another example, the suppressing agent may include and/or be conventional scale inhibitor 82. The conventional scale inhibitor may both inhibit scale formation within the portion of the subterranean formation and suppress dissolution of selective-release scale inhibitor 70 within water while the conventional scale inhibitor is present within the subterranean formation and/or while the conventional scale inhibitor has greater than the threshold concentration within water that is present within the portion of the subterranean formation.

It is within the scope of the present disclosure that subterranean formation 40, portion 46, and/or hydrocarbon well 50 may include a plurality of selective-release scale inhibitors 70 and/or may have a plurality of selective-release scale inhibitors 70 contained therein. Under these conditions, at least one of the plurality of selective-release scale inhibitors may be soluble in water and/or may initiate suppression of scale formation at different environmental conditions than at least one other of the plurality of selective-release scale inhibitors.

As an example, selective-release scale inhibitor 70 may be a first selective-release scale inhibitor 70 and a second selective-release scale inhibitor 84 also may be present within subterranean formation 40, portion 46, and/or hydrocarbon well 50. In addition, the first selective-release scale inhibitor may be configured such that dissolution of the second selective-release scale inhibitor in water suppresses dissolution of the first selective-release scale inhibitor in the water. Under these conditions, the initial environmental conditions may include greater than a threshold concentration of the second selective-release scale inhibitor in the water, and the subsequent environmental conditions may include less than the threshold concentration of the second selective-release scale inhibitor in water. Examples of the threshold concentration are disclosed herein with reference to suppressing agent 80.

It is within the scope of the present disclosure that the second selective-release scale inhibitor may be configured to suppress dissolution of the first selective-release scale inhibitor in any suitable manner. As an example, the second selective-release scale inhibitor may be configured to release suppressing agent 80 into the portion of the subterranean formation to suppress dissolution of the first selective-release scale inhibitor. Examples of suppressing agent 80 are disclosed herein.

It is also within the scope of the present disclosure that the plurality of selective-release scale inhibitors 70 may include any suitable number of selective-release scale inhibitors. As an example, subterranean formation 40, portion 46, and/or hydrocarbon well 50 further may include a third selective-release scale inhibitor 88, and the third selective-release scale inhibitor may be configured to suppress dissolution of the second selective-release scale inhibitor in water.

Wellbore 60 may include any suitable structure that may extend within subterranean formation 40, that may extend within subsurface region 30, that may extend between surface region 20 and subterranean formation 40, and/or that may provide a fluid conduit for flow of reservoir fluids 41, such as hydrocarbons 42 and/or water 44, from subterranean formation 40 and/or to surface region 20. In addition, wellbore 60 may have and/or define any suitable shape. As an example, and as illustrated in solid lines in FIG. 1, wellbore 60 may include and/or be a vertical, or at least substantially vertical, wellbore 60. As another example, and as illustrated in dashed lines in FIG. 1, wellbore 60 additionally or alternatively may include and/or be a horizontal and/or a deviated wellbore 60.

Hydrocarbon well 50 may include additional structure and/or structures that may be conventional to hydrocarbon wells. As examples, hydrocarbon well 50 may include any suitable number of valves, pumps, tubulars, fittings, casings, and the like.

Hydrocarbons 42 may include any suitable hydrocarbon, or hydrocarbon-based, fluid, or fluids, that may be present within subterranean formation 40, that may be native to subterranean formation 40, and/or that may be naturally occurring within subterranean formation 40. As examples, hydrocarbons 42 may include and/or be gaseous hydrocarbons, liquid hydrocarbons, crude oil, and/or shale oil.

FIG. 2 is a flowchart depicting methods 100, according to the present disclosure, of inhibiting scale formation in a hydrocarbon well that extends within a subterranean formation. Methods 100 may include determining initial environmental conditions at 110 and/or selecting a selective-release scale inhibitor at 120. Methods 100 include locating the selective-release scale inhibitor at 130 and may include locating a conventional scale inhibitor at 140 and/or locating a suppressing agent at 150. Methods 100 further include producing reservoir fluid from the subterranean formation at 160 and facilitating a change in environmental conditions at 170.

Determining the initial environmental conditions at 110 may include determining initial environmental conditions that may be present within a portion of the subterranean formation. When methods 100 include the determining at 110, the selecting at 120 may be based upon, may be based, at least in part, on, and/or may be responsive to the determining at 110.

The determining at 110 may include determining any suitable initial, current, present, native, and/or naturally occurring environmental condition within the portion of the subterranean formation. As examples, the determining at 110 may include determining, quantifying, and/or measuring a temperature of the portion of the subterranean formation, a pH of the portion of the subterranean formation, a concentration of a solute within water that is present within the portion of the subterranean formation, a salinity of the water, an electromagnetic field strength within the portion of the subterranean formation, a light intensity within the portion of the subterranean formation, and/or a sound intensity within the portion of the subterranean formation.

Selecting the selective-release scale inhibitor at 120 may include selecting the selective-release scale inhibitor such that the selective-release scale inhibitor is at least substantially insoluble in hydrocarbons and also is at least substantially insoluble in water at initial environmental conditions that are present within the portion of the subterranean formation. This may include selecting the selective-release scale inhibitor based, at least in part, on the initial environmental conditions. As discussed, the initial environmental conditions may be, or may have been, determined during the determining at 110.

The selecting at 120 may include selecting in any suitable manner. As an example, the selecting at 120 may include selecting such that the selective-release scale inhibitor has an initial solubility within water (i.e., under the initial environmental conditions) of less than a threshold initial solubility. Examples of the threshold initial solubility include solubilities of less than 0.1 parts per million (ppm), less than 0.2 ppm, less than 0.4 ppm, less than 0.6 ppm, less than 0.8 ppm, less than 1 ppm, less than 2 ppm, less than 3 ppm, less than 5 ppm, less than 7.5 ppm, or less than 10 ppm. As another example, the selecting at 120 additionally or alternatively may include selecting such that the selective-release scale inhibitor has a subsequent solubility in water (i.e., under the subsequent environmental conditions) of greater than a threshold subsequent solubility. Examples of the threshold subsequent solubility include solubilities of at least 1 ppm, at least 2 ppm, at least 4 ppm, at least 6 ppm, at least 8 ppm, at least 10 ppm, at least 15 ppm, at least 20 ppm, at least 30 ppm, at least 40 ppm, at least 50 ppm, at least 75 ppm, or at least 100 ppm.

Locating the selective-release scale inhibitor at 130 may include locating the selective-release scale inhibitor within the portion of the subterranean formation. This may include locating while the initial environmental conditions are present, or exist, within the subterranean formation.

It is within the scope of the present disclosure that the locating at 130 may be accomplished in any suitable manner. As an example, methods 100 may include stimulating the subterranean formation, such as during formation and/or completion of the hydrocarbon well, and the locating at 130 may include locating during the stimulating.

As another example, methods 100 may include fracturing the subterranean formation, such as during formation and/or completion of the hydrocarbon well, and the locating at 130 may include locating during the fracturing. As a more specific example, the fracturing may include propping fractures, which may be generated during the fracturing, with a proppant, and the locating at 130 may include locating during the propping. Under these conditions, the selective-release scale inhibitor may encapsulate the proppant, may be mixed with the proppant, may be adsorbed onto the proppant, may be absorbed within the proppant, may coat the proppant, and/or may be embedded within the proppant.

As yet another example, the locating at 130 additionally or alternatively may include locating the selective-release scale inhibitor during a post-production squeeze treatment of the subterranean formation. This may include ceasing production of reservoir fluids from the subterranean formation and pumping the selective-release scale inhibitor into the portion of the subterranean formation as a solid, liquid, and/or slurry.

As another example, the locating at 130 may include locating during a gravel packing operation. This may include mixing the selective-release scale inhibitor with the gravel prior to locating the gravel within the portion of the subterranean formation and/or providing the selective-release scale inhibitor to the portion of the subterranean formation prior to and/or subsequent to locating the gravel within the portion of the subterranean formation.

As yet another example, the locating at 130 may include locating during an acid treatment of the subterranean formation. This may include providing the selective-release scale inhibitor to the portion of the subterranean formation prior to, subsequent to, and/or concurrently with the acid treatment of the subterranean formation.

It is within the scope of the present disclosure that the locating at 130 may include locating a plurality of selective-release scale inhibitors within the portion of the subterranean formation. As an example, the locating at 130 may include locating a first selective-release scale inhibitor and locating a second selective-release scale inhibitor within the portion of the subterranean formation. Under these conditions, dissolution of the second selective-release scale inhibitor in water that is present within the portion of the subterranean formation may suppress dissolution of the first selective-release scale inhibitor within the water.

When the locating at 130 includes locating the plurality of selective-release scale inhibitors, the individual selective-release scale inhibitors may be located within the portion of the subterranean formation in any suitable order and/or with any suitable sequence. As an example, the locating the first selective-release scale inhibitor may be prior to, subsequent to, at least partially concurrent with, and/or simultaneous with the locating the second selective-release scale inhibitor.

When the locating at 130 includes locating the plurality of selective-release scale inhibitors, and as discussed herein, the initial environmental conditions may include greater than a threshold concentration of the second selective-release scale inhibitor within water that is present within the portion of the subterranean formation. In addition, the subsequent environmental conditions may include less than the threshold concentration of the second selective-release scale inhibitor within the water. Under these conditions, presence of the second selective-release scale inhibitor may suppress dissolution of the first selective-release scale inhibitor in water. Examples of the threshold concentration are disclosed herein.

Suppression of the dissolution of the first selective-release scale inhibitor by the second selective-release scale inhibitor may be accomplished in any suitable manner. As an example, the second selective-release scale inhibitor may be configured to release a suppressing agent into the portion of the subterranean formation, and the suppressing agent may suppress dissolution of the first selective-release scale inhibitor within the water. Examples of the suppressing agent are disclosed herein.

It is within the scope of the present disclosure that the locating at 130 further may include locating a third selective-release scale inhibitor within the portion of the subterranean formation. Under these conditions, the third selective-release scale inhibitor may be configured to suppress dissolution of the second selective-release scale inhibitor within water. It is also within the scope of the present disclosure that the plurality of selective-release scale inhibitors may include any suitable number of selective-release scale inhibitors, with each of the plurality of selective-release scale inhibitors being configured to suppress dissolution, within water, of at least one other of the plurality of selective-release scale inhibitors.

Locating the conventional scale inhibitor at 140 may include locating any suitable conventional scale inhibitor within the portion of the subterranean formation. As discussed herein, the conventional scale inhibitor may be depleted relatively quickly from the subterranean formation when compared to the selective-release scale inhibitor that is located during the locating at 130; however, the conventional scale inhibitor may provide initial and/or startup scale inhibition for the hydrocarbon well. Stated another way, and when methods 100 include the locating at 140, the conventional scale inhibitor generally will initiate dissolution within water and/or inhibition of scale formation immediately upon contact with water, with the selective-release scale inhibitor being utilized to provide secondary, later, additional, longer-lasting, and/or selective scale inhibition after the conventional scale inhibitor has been at least partially, or even completely, depleted from the subterranean formation.

Locating the suppressing agent at 150 may include locating any suitable suppressing agent within the portion of the subterranean formation in any suitable manner. As discussed, the suppressing agent may be configured to suppress dissolution of the selective-release scale inhibitor in water and may be separate and/or distinct from the one or more selective-release scale inhibitors that may be located during the locating at 130. However, this is not required.

It is within the scope of the present disclosure that the locating at 150 may include locating at any suitable time and/or with any suitable sequence during methods 100. As examples, the locating at 150 may include locating prior to, subsequent to, at least partially concurrently with, and/or simultaneously with the locating at 130.

When methods 100 include the locating at 150, the initial environmental conditions may include greater than a threshold concentration of the suppressing agent within water that is present within the portion of the subterranean formation. Conversely, the subsequent environmental conditions may include less than the threshold concentration of the suppressing agent within the water. Examples of the threshold concentration and of the suppressing agent are disclosed herein.

Producing reservoir fluid from the subterranean formation at 160 may include producing the reservoir fluid utilizing, via, and/or by flowing the reservoir fluid through at least a portion of the hydrocarbon well. This may include flowing the reservoir fluid from the subterranean formation, flowing the reservoir fluid along a wellbore of the hydrocarbon well, and/or flowing the reservoir fluid to a surface region. Examples of the reservoir fluid are disclosed herein.

Facilitating the change in the environmental conditions at 170 may include changing and/or varying the environmental conditions within the portion of the subterranean formation. This may include changing the environmental conditions from the initial environmental conditions to the subsequent environmental conditions. As discussed, and under the initial environmental conditions, the selective-release scale inhibitor may be at least substantially, or even completely, insoluble in water. Conversely, and under the subsequent environmental conditions, the selective-release scale inhibitor may be soluble in water. Stated another way, the selective-release scale inhibitor may be, or may be configured to be, more soluble in water at the subsequent environmental conditions than at, or compared to, the initial environmental conditions. Thus, the facilitating at 170 may include initiating dissolution of the selective-release scale inhibitor within the water upon, or responsive to, fluid contact between the selective-release scale inhibitor and the water at the subsequent environmental conditions.

It is within the scope of the present disclosure that, under the subsequent environmental conditions, the selective-release scale inhibitor may have at least a threshold solubility in water. Thus, the facilitating at 170 may include establishing at least a threshold concentration of the selective-release scale inhibitor within water that is present in the portion of the subterranean formation, and the establishing may be responsive to the subsequent environmental conditions being present within the portion of the subterranean formation. Examples of the threshold solubility and/or of the threshold concentration include solubilities and/or concentrations of at least 0.5 parts per million (ppm), at least 1 ppm, at least 2 ppm, at least 4 ppm, at least 6 ppm, at least 8 ppm, at least 10 ppm, at least 15 ppm, at least 20 ppm, at least 30 ppm, at least 40 ppm, at least 50 ppm, at least 75 ppm, or at least 100 ppm.

As used herein, the phrase "facilitating a change," the phrase "facilitating the change," or simply the word "facilitating," when utilized in the context of the facilitating at 170, are intended to convey that an owner of the hydrocarbon well, an operator of the hydrocarbon well, a control system that controls the operation of at least a portion of the hydrocarbon well, and/or one or more hardware components that are associated with the hydrocarbon well bring about, produce, facilitate, enable, expedite, create, allow, permit, and/or generate the change in the environmental conditions. This may include actively and/or passively facilitating the change. With this in mind, the facilitating at 170 also may be referred to herein as bringing about the change, producing the change, enabling the change, expediting the change, creating the change, allowing the change, permitting the change, and/or generating the change. Furthermore, "changing" of a parameter, value, or condition may include increasing or decreasing the parameter, value, or condition.

It is within the scope of the present disclosure that the selective-release scale inhibitor may be configured to continuously dissolve in the water subsequent, or responsive, to the change from the initial environmental conditions to the subsequent environmental conditions. This may include continuously dissolving in the water regardless of environmental conditions that occur within the hydrocarbon well following the subsequent environmental conditions. Thus, the change from the initial environmental conditions to the subsequent environmental conditions may initiate and/or start dissolution of the selective-release scale inhibitor in an irreversible, or at least substantially irreversible, manner.

However, this is not required; and the selective-release scale inhibitor also may be configured to dissolve in water when, or only when, the subsequent environmental conditions are present within the portion of the subterranean formation. In this situation, the facilitating at 170 may include continuously, or at least substantially continuously, facilitating until the selective-release scale inhibitor is completely, or at least substantially completely, dissolved in the water and/or until the selective-release scale inhibitor is completely, or at least substantially completely, depleted from the portion of the subterranean formation.

Additionally or alternatively, the facilitating at 170 may include selectively, periodically, and/or intermittently facilitating the change to the subsequent environmental conditions and/or from the initial environmental conditions to the subsequent environmental conditions. In this situation, the selective-release scale inhibitor may be configured to be soluble in water when the subsequent environmental conditions are present within the portion of the subterranean formation and to be at least substantially insoluble in water when the subsequent environmental conditions are not present within the portion of the subterranean formation and/or when the initial environmental conditions are present within the subterranean formation. Thus, the intermittently facilitating may include intermittently dissolving the selective-release scale inhibitor in water followed by resisting dissolution of the selective-release scale inhibitor.

As illustrated in dashed lines in FIG. 2, the facilitating at 170 may include actively changing from the initial environmental conditions to the subsequent environmental conditions, as indicated at 171. Actively changing the environmental conditions may include directly and/or purposefully effecting the change in the environmental conditions. Examples of actively changing the environmental conditions are discussed in more detail herein.

Additionally or alternatively, the facilitating at 170 also may include passively effecting a change from the initial environmental conditions to the subsequent environmental conditions, as indicated at 172. Passively changing the environmental conditions may include indirectly and/or incidentally effecting the change in the environmental conditions. As an example, the producing at 160 may cause a change in the temperature, chemistry, and/or composition of one or more reservoir fluids that may be present within the subterranean formation. Such a change may correspond to the change from the initial environmental conditions to the subsequent environmental conditions. Thus, the passively effecting at 172 may be responsive to, may include, and/or may be a result of the producing at 160.

As a more specific example, the facilitating at 170 may include changing a signal that is supplied to the portion of the subterranean formation, as indicated at 173. This may include transmitting the signal within the portion of the subterranean formation, initiating transmission of the signal within the portion of the subterranean formation, ceasing transmission of the signal within the portion of the subterranean formation, and/or changing the signal in any suitable manner. The transmitting may include generating the signal in a surface region and conveying the signal along the hydrocarbon well to the portion of the subterranean formation. The transmitting additionally or alternatively may include powering the transmitting via a power source that is present within the surface region, wirelessly transmitting the signal, transmitting the signal with a wire, and/or transmitting the signal with an autonomous transmitter that is present within the hydrocarbon well.

As an example, the changing at 173 may include changing an ultrasonic signal intensity within the portion of the subterranean formation to effect the change from the initial environmental conditions to the subsequent environmental conditions. As another example, the changing at 173 may include changing a radio frequency signal intensity within the portion of the subterranean formation to effect the change. As yet another example, the changing at 173 may include changing an electromagnetic signal intensity within the portion of the subterranean formation to effect the change.

As another more specific example, the facilitating at 170 may include changing a field that is present within and/or that is supplied to the portion of the subterranean formation, as indicated at 174. This may include changing a magnitude of the field within the portion of the subterranean formation, establishing the field within the portion of the subterranean formation, and/or eliminating the field from the portion of the subterranean formation. Examples of the field include an electromagnetic field, a magnetic field, an electric field, an electric potential, and/or visible light.

As yet another more specific example, the facilitating at 170 may include changing a chemistry within the portion of the subterranean formation, as indicated at 175. As an example, and under the initial environmental conditions, water present within the portion of the subterranean formation may be at least substantially fresh water, and the changing at 175 may include flowing salt water into the portion of the subterranean formation to effect the change in the environmental conditions. Conversely, under the initial environmental conditions, water present within the portion of the subterranean formation may be salt water, and the changing at 175 may include flowing fresh water into the portion of the subterranean formation to effect the change in the environmental conditions. Stated another way, the changing (i.e., increasing or decreasing) at 175 may include changing a salinity of water that is present within the portion of the subterranean formation and/or changing a concentration of a solute that is present within the portion of the subterranean formation.

As another example, the changing at 175 may include changing a pH of the water that is present in the portion of the subterranean formation. This may include providing an acid to the portion of the subterranean formation, diluting the acid, providing a base to the portion of the subterranean formation, and/or diluting the base.

As another more specific example, the facilitating at 170 may include changing a temperature within the portion of the subterranean formation, as indicated at 176. As an example, the changing at 176 may include heating the portion of the subterranean formation to effect the change in the environmental conditions. As another example, the changing at 176 additionally or alternatively may include cooling the portion of the subterranean formation to effect the change. The cooling may be performed by directly cooling the portion, such as by heat exchange with a colder fluid stream or indirectly cooling the portion, such as by reducing or ceasing hearing of the portion.

As yet another more specific example, the facilitating at 170 may include initiating dissolution of the selective-release scale inhibitor, as indicated at 177. The initiating at 177 may be subsequent, or responsive, to fluid contact between the selective-release scale inhibitor and water while the subsequent environmental conditions are present within the portion of the subterranean formation (or under the subsequent environmental conditions). The initiating at 177 additionally or alternatively may be referred to herein as initiating dissolution of the selective-release scale inhibitor subsequent to and/or responsive to the initial environmental conditions no longer being present within the portion of the subterranean formation. The initiating at 177 also may include initiating dissolution to at least a threshold concentration of the selective-release scale inhibitor in water. The threshold concentration may be greater than a concentration of the selective-release scale inhibitor in water under the initial environmental conditions. Examples of the threshold concentration are disclosed herein.

It is within the scope of the present disclosure that methods 100 may include and/or that the selective-release scale inhibitor may be configured such that the facilitating at 170 includes facilitating subsequent to performing the producing at 160 for at least a threshold production time. Such a configuration may aid and/or permit inhibition of scale formation over a much longer timeframe than may be obtained utilizing conventional scale inhibitors, as discussed herein. Examples of the threshold production time include threshold production times of at least 1 day, at least 1 week, at least 1 month, at least 3 months, at least 6 months, at least 9 months, at least 1 year, at least 2 years, at least 3 years, at least 4 years, or at least 5 years.

In some aspects, a hydrocarbon well may be prepared according to any of the above methods or systems, wherein preparing such well my comprise a wellbore that extends within a subterranean formation; and a selective-release scale inhibitor located within a portion of the subterranean formation, wherein the selective-release scale inhibitor is configured to be at least substantially insoluble in hydrocarbons and also configured to be at least substantially insoluble in water at initial environmental conditions, which are present within the portion of the subterranean formation when the selective-release scale inhibitor initially is located within the portion of the subterranean formation, and to be soluble in water at subsequent environmental conditions, which are present within the portion of the subterranean formation subsequent to the selective-release scale inhibitor being located within the portion of the subterranean formation.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of inhibiting scale formation in a hydrocarbon well that extends within a subterranean formation, the method comprising:
   locating a selective-release scale inhibitor within a portion of the subterranean formation, wherein the selective-release scale inhibitor is configured to be at least substantially insoluble in hydrocarbons;
   producing a reservoir fluid from the subterranean formation via the hydrocarbon well; and
   facilitating a change in environmental conditions present within the portion of the subterranean formation from initial environmental conditions, in which the selective-release scale inhibitor is at least substantially insoluble in water, to subsequent environmental conditions, in which the selective-release scale inhibitor is soluble in water, wherein the facilitating includes initiating dissolution of the selective-release scale inhibitor responsive to fluid contact between the selective-release scale inhibitor and water at the subsequent environmental conditions;
   wherein the selective-release scale inhibitor is a first selective-release scale inhibitor, and further wherein the method includes locating a second selective-release scale inhibitor within the portion of the subterranean formation, wherein dissolution of the second selective-release scale inhibitor in water suppresses dissolution of the first selective-release scale inhibitor within water.

2. The method of claim 1, wherein the initial environmental conditions include greater than a threshold concentration of the second selective-release scale inhibitor within water that is present within the portion of the subterranean formation, and further wherein the subsequent environmental conditions include less than the threshold concentration of the second selective-release scale inhibitor within water that is present within the portion of the subterranean formation.

3. The method of claim 1, wherein the second selective-release scale inhibitor is configured to release a suppressing agent into the portion of the subterranean formation.

4. The method of claim 1, wherein the method further includes locating a third selective-release scale inhibitor within the portion of the subterranean formation, wherein the third selective-release scale inhibitor is configured to suppress dissolution of the second selective-release scale inhibitor within water.

5. The method of claim 1, wherein the method further includes locating a suppressing agent within the portion of the subterranean formation, wherein the suppressing agent is configured to suppress dissolution of the selective-release scale inhibitor within water, wherein the initial environmental conditions include greater than a threshold concentration of the suppressing agent within water that is present within the portion of the subterranean formation, and further wherein the subsequent environmental conditions include less than the threshold concentration of the suppressing agent within water that is present within the portion of the subterranean formation.

6. The method of claim 1, wherein, responsive to the facilitating, the selective-release scale inhibitor is configured to continuously dissolve in the water.

7. The method of claim 1, wherein the method includes intermittently facilitating the change from the initial environmental conditions to the subsequent environmental conditions, wherein the selective-release scale inhibitor is configured to be soluble in the water when the subsequent environmental conditions are present within the portion of the subterranean formation and at least substantially insoluble in the water when the initial environmental conditions are present within the portion of the subterranean formation.

8. The method of claim 7, wherein the intermittently facilitating includes intermittently dissolving the selective-release scale inhibitor in water followed by resisting dissolution of the selective-release scale inhibitor in water.

9. The method of claim 1, wherein the facilitating includes actively effecting the change from the initial environmental conditions to the subsequent environmental conditions.

10. The method of claim 1, wherein the facilitating includes transmitting a signal within the portion of the subterranean formation to effect the change.

11. The method of claim 10, wherein the transmitting includes generating the signal in a surface region and conveying the signal along the hydrocarbon well to the portion of the subterranean formation to effect the change.

12. The method of claim 1, wherein, under the initial environmental conditions, water present within the portion of the subterranean formation is at least substantially fresh water, and further wherein the facilitating includes flowing salt water into the portion of the subterranean formation to effect the change.

13. The method of claim 1, wherein, under the initial environmental conditions, water present within the portion of the subterranean formation is salt water, and further wherein the facilitating includes flowing fresh water into the portion of the subterranean formation to effect the change.

14. The method of claim 1, wherein the facilitating includes at least one of:
   (i) providing an acid to the portion of the subterranean formation to effect the change;
   (ii) diluting an acid that is present within the portion of the subterranean formation during the locating to effect the change;
   (iii) providing a base to the portion of the subterranean formation to effect the change; and
   (iv) diluting a base that is present within the portion of the subterranean formation during the locating to effect the change.

15. The method of claim 1, wherein the facilitating includes at least one of:
   (i) heating the portion of the subterranean formation effect the change; and
   (ii) cooling the portion of the subterranean formation to effect the change.

16. The method of claim 1, wherein the facilitating includes at least one of:
   (i) changing a concentration of a solute within water present within the portion of the subterranean formation to effect the change;
   (ii) changing a salinity of water present within the portion of the subterranean formation to effect the change;
   (iii) changing a light intensity within the portion of the subterranean formation to effect the change;
   (iv) changing a magnetic field intensity within the portion of the subterranean formation to effect the change;
   (v) changing an electric field intensity within the portion of the subterranean formation to effect the change;
   (vi) changing an electric potential of the portion of the subterranean formation to effect the change;
   (vii) changing an ultrasonic signal intensity within the portion of the subterranean formation to effect the change;
   (viii) changing a radio frequency signal intensity within the portion of the subterranean formation to effect the change; and
   (ix) changing an electromagnetic signal intensity within the portion of the subterranean formation to effect the change.

17. The method of claim 1, wherein the facilitating is at least partially responsive to the producing.

18. The method of claim 1, wherein the facilitating includes passively effecting the change from the initial environmental conditions to the subsequent environmental conditions.

19. The method of claim 1, wherein the facilitating includes facilitating subsequent to producing for at least a threshold production time of at least 1 year.

20. The method of claim 1, wherein the facilitating includes establishing greater than a 10 ppm concentration of the selective-release scale inhibitor in water within the subterranean formation responsive to the subsequent environmental conditions being present within the portion of the subterranean formation.

* * * * *